United States Patent [19]

Mulaskey et al.

[11] Patent Number: 5,382,353
[45] Date of Patent: Jan. 17, 1995

[54] PRETREATMENT METHOD FOR INCREASING CONVERSION OF REFORMING CATALYST

[75] Inventors: Bernard F. Mulaskey, Fairfax; Robert L. Hise, Fairfield; Steven E. Trumbull, San Leandro; William J. Cannella, Hercules; Robert A. Innes, San Rafael, all of Calif.

[73] Assignee: Chevron Research & Technology Co., a Div. of Chevron U.S.A. Inc., San Francisco, Calif.

[21] Appl. No.: 151,814

[22] Filed: Nov. 15, 1993

Related U.S. Application Data

[63] Continuation-in-part of Ser. No. 976,786, Nov. 16, 1992, abandoned.

[51] Int. Cl.$^6$ .................... C10G 35/095; B01J 29/10; B01J 29/32
[52] U.S. Cl. ..................................... 208/138; 502/66; 502/74
[58] Field of Search ..................... 502/66, 74; 208/138

[56] References Cited

U.S. PATENT DOCUMENTS

| | | | |
|---|---|---|---|
| 4,517,306 | 5/1985 | Buss et al. | 502/74 |
| 4,539,305 | 9/1985 | Wilson et al. | 502/66 |
| 4,627,912 | 12/1986 | Field | 208/138 |
| 4,636,298 | 1/1987 | Buss et al. | 208/65 |
| 4,650,565 | 3/1987 | Jacobson et al. | 208/138 |
| 4,795,549 | 1/1989 | Coughlin et al. | 208/139 |
| 5,314,854 | 5/1994 | Galperin | 502/66 |

OTHER PUBLICATIONS

P. G. Menon, *Advances in Catalysis Science and Technology*, "Some Contributions to the Surface Chemistry of Platinum Reforming Catalysts", Ed. by T. S. R. Prasada (1985).

M. Vaarkamp et al, "Influence of Hydrogen Pretreatment on the Structural and Catalytic Properties of Pt/K-LTL Catalyst".

F. S. Modica et al, "Metal-Support Interactions in Supported Platinum Catalysts".

*Primary Examiner*—Carl F. Dees
*Attorney, Agent, or Firm*—Burns, Doane, Swecker & Mathis

[57] ABSTRACT

A pretreatment process is disclosed for increasing conversion and reducing the fouling rate of reforming catalysts wherein the catalyst is pretreated at a temperature from 1025° F. to 1275° F. in a reducing atmosphere prior to contacting the catalyst with a hydrocarbon feed in the presence of hydrogen.

25 Claims, 2 Drawing Sheets

PRETREATMENT METHOD FOR INCREASING CONVERSION OF REFORMING CATALYST

CROSS-REFERENCE TO RELATED APPLICATION

This application is a continuation-in-part of U.S. application Ser. No. 976,786, filed Nov. 16, 1992 and now abandoned.

BACKGROUND OF THE INVENTION

The present invention concerns a pretreatment method useful for increasing the conversion and lowering the fouling rate of a reforming catalyst.

Catalytic reforming is a well-known process that is used for raising the octane rating of a naphtha for gasoline. The reactions that occur during reforming include: dehydrogenation of cyclohexanes, dehydroisomerization of alkylcyclopentanes, dehydrocyclization of acyclic hydrocarbons, dealkylation of alkylbenzenes, isomerization of paraffins, and hydrocracking of paraffins. The hydrocracking reaction should be suppressed because that reaction lowers the yield of hydrogen and lowers the yield of liquid products.

Reforming catalysts must be selective for dehydrocyclization, in order to produce high yields of liquid product and low yields of light gases. These catalysts should possess good activity, so that low temperatures can be used in the reformer. Also, they should possess good stability, so that they can maintain a high activity and a high selectivity for dehydrocyclization over a long period of time.

While most reforming catalysts contain platinum on an alumina support, large-pore zeolites have been proposed as supports. These large-pore zeolites have pores large enough for hydrocarbons in the gasoline boiling range to pass through. Commercial application of zeolitic reforming catalysts have thus far been very limited, although certain catalysts comprising a large-pore zeolite containing at least one Group VIII metal have a very high selectivity for dehydrocyclization.

It is known that reforming catalysts require pretreatment prior to utilizing these catalysts for reforming naphtha feedstocks. For example, U.S. Pat. No. 4,517,306 issued to Waldeen Buss on May 14, 1985 claims a composition comprising: (a) a type L zeolite; (b) at least one Group VIII metal; and (c) an alkaline earth metal selected from the group consisting of barium, strontium and calcium, wherein said composition is reduced in a hydrogen atmosphere at a temperature of from 480° C. to 620° C. (896° to 1148° F.). It is preferred that the composition be reduced at a temperature from 550° to 620° C. (1022° to 1148° F.).

U.S. Pat. No. 4,539,304 issued on Sep. 3, 1985 to Field discloses a two-step pretreatment process for increasing the conversion of reforming catalysts wherein the catalyst is first treated at a temperature of from 120° C. (248° F.) to 260° C. (500° F.) in a reducing gas. In the second step, the temperature of the catalyst is maintained at 370° C. (698° F.) to 600° C. (1112° F.) in a reducing atmosphere.

U.S. Pat. No. 4,539,305 issued on Sep. 3, 1985 to Wilson et. al. discloses a pretreatment process for enhancing the selectivity and increasing the stability of a reforming catalyst comprising a large-pore zeolite containing at least one Group VIII metal. The catalyst is reduced in a reducing atmosphere at a temperature of from 250° C. (482°) to 650° (1202° F.). The reduced catalyst is subsequently exposed to an oxygen-containing gas and then treated in a reducing atmosphere at a temperature of from 120° C. (248° F.) to 260° C. (500° F.). Finally, the catalyst is maintained at a temperature of from 370° C. (698° F.) to 600° C. (1112° F.) in a reducing atmosphere. Preferably, the first reduction step is carried out in the presence of hydrogen.

U.S. Pat. No. 5,155,075 issued to Innes et. al. shows an initial catalyst reduction at 300° F. to 700° F., followed by a temperature ramp up to a final hydrogen treatment temperature between 900° F. and 1000° F.

U.S. Pat. No. 5,066,632 issued on Nov. 19, 1991 to Baird et. al. discloses a process for pretreating a catalyst useful for reforming a naphtha wherein the catalyst is calcined at temperatures in excess of 500° F., preferably at temperatures ranging from 500° F. to about 750° F. in air or in atmospheres containing low partial pressures of oxygen or in a non-reactive or inert gas such as nitrogen. The catalyst is then contacted with a dry hydrogen-containing gas at a temperature ranging from about 600° F. to about 1000° F., preferably from about 750° F. to about 950° F., at a hydrogen partial pressure ranging from about 1 atmosphere to about 40 atmospheres, preferably from 5 atmospheres to about 30 atmospheres.

European Patent Application Publication Number 243,129 discloses a catalyst activation treatment with hydrogen at temperatures from 400° C. (752° F.) to 800° C. (1472° F.), preferably from 400° C. (752° F.) to 700° C. (1292° F.) for a catalyst used for cracking a hydrocarbon feedstock. The treatment pressure may vary from 100 to 5,000 MPa but is preferably from 100 to 2,000 MPa. A carrier gas which contains 1–100% v/v, preferably from 30–100% v/v, of hydrogen is used.

U.S. Pat. No. 4,717,700 issued to Venkatram et. al. discloses a method for drying a zeolite catalyst by heating while in contact with a gas. The rate of catalyst temperature increase is controlled so as to limit the rate of water evolution from the catalyst and the water vapor concentration in the gas. The gas used to heat the catalyst is gradually increased in temperature at about 28° C. per hour. The moisture level of the effluent gas is preferably between 500 and 1500 ppm during the drying step. The catalyst drying method with a subsequent reduction with hydrogen wherein the temperature is raised to a maximum temperature of 450° C. is exemplified in Example 1.

Austrian Patent Specification No. 268,210 relates to a metal-charged zeolite molecular sieve, which is suitable as a catalyst for the conversion of hydrocarbons. Methods for preparing the catalyst are described. It is disclosed that the catalyst prepared by such methods usually has a high water content and that it is desirable to activate the catalyst before use since the catalyst is sensitive to water. The recommended activation process comprises: 1) slow heating of the catalyst in air at 300° to 600° C., preferably 500° C.; followed by 2) slow heating of the catalyst from room temperature to approximately 500° C. in a current of hydrogen gas under atmospheric pressure.

A pretreatment process of Pt-$Al_2O_3$ catalysts in hydrogen in the temperature range of 450° C. (842° F.) to 600° C. (1112° F.) is disclosed in Journal of Catalysis (1979); Vol. 59, p. 138 (P. G. Menon and G. F. Froment). The effect of catalyst reduction temperature on the conversion of n-pentane and n-hexane using Pt-$Al_2O_3$ catalysts is disclosed. For the Pt-$Al_2O_3$ catalyst reduced at 400° C. (752° F.), hydrogenolysis is the main reaction; whereas for the Pt-Al$_2$O$_3$ catalyst reduced at 600° C. (1112°), the hydrogenolysis and total activity are considerably suppressed. This reference specifically discloses the effect of a hydrogen pretreatment process on Pt-Al$_2$O$_3$ catalysts and does not disclose the effect of hydrogen pretreatment on zeolitic catalyst.

Additionally, the effects of hydrogen pretreatment of the Pt-Al$_2$O$_3$ catalyst with respect to isomerization is disclosed. The activity for dehydrocyclization was not increased.

Prior art processes have observed both a reduced catalytic activity and reduced hydrogen chemisorption for catalysts which have been reduced at temperatures in excess of 500° C. Furthermore, there has been no clear understanding of the phenomena which occur during high temperature catalyst reduction. Thus, reduction at high temperatures may result in strongly chemisorbed hydrogen, may cause loss of spillover hydrogen altering the local charge transfer from the support to the metal at the particle boundary, may induce changes in morphology of the metal crystallite, or may affect reduction of the support resulting in the formation of an alloy with atoms from the support.

SUMMARY OF THE INVENTION

The present invention is a process for increasing the conversion and lowering the fouling rate of large-pore zeolitic reforming catalysts using a pretreatment process. The catalyst is treated in a reducing gas at a temperature of from 1025° F. to 1275° F.

Preferably, the pretreatment process in the range of 1025° F. to 1275° F. occurs in the presence of hydrogen at a pressure of from 0 to 300 psig for from 1 hour to 120 hours. Generally, the higher the treatment temperature employed, the shorter the treatment time needed to achieve the desired effect.

More preferably, the catalyst is reduced with dry hydrogen via temperature-programmed steps, with the treatment of the present invention occurring at the final temperature of from 1025° F. to 1275° F. The procedure of the present invention which occurs in the temperature range of from 1025° F. to 1275° F. is considered and referred to as a "treatment" of the catalyst as opposed to a "reduction", because the catalyst has already generally been reduced at the lower temperatures prior to reaching the treatment temperature of the present invention.

Among other factors, we have found that large-pore zeolitic catalysts which have been pretreated in a reducing gas in the high temperature range of from about 1025° F. to 1275° F. is found to have a lower fouling rate and improved activity, and have a longer run life. In particular, this catalyst exhibits a longer run life with heavier feedstocks than with similar catalysts using other pretreatment processes. For example, if a L zeolite catalyst is pretreated by conventional methods, run lengths with feeds containing C$_9$+ hydrocarbons are generally short. The pretreatment procedure of this invention, however, makes it practical to process feedstocks containing as much as 5–15 wt % C$_9$+ hydrocarbons.

Thus, in spite of the disadvantages that the prior art recognizes with respect to high temperature catalyst reduction, the present inventors have discovered an advantageous high temperature catalyst treatment method. In particular, the present invention has surprisingly found that a high temperature treatment (i.e., at 1025° F. to 1275° F.) will result in a catalyst with a reduced fouling rate and sufficient catalytic activity to yield a longer run life, particularly if the temperature increase during reduction is performed in a gradual ramping or stepwise fashion, and if the water content of the effluent gas is kept as low as possible during the high temperature treatment range. Even catalysts that are on balance non-acidic still contain a few residual acidic sites. This high temperature treatment regimen is believed to reduce the number of acid sites on the catalyst, and thereby reduce side reactions which lead to the formation of coke. The improved fouling rate and conversion activity of the catalyst also allow for more beneficial use with a heavier feedstock.

DETAILED DESCRIPTION OF THE INVENTION

Figure 1:
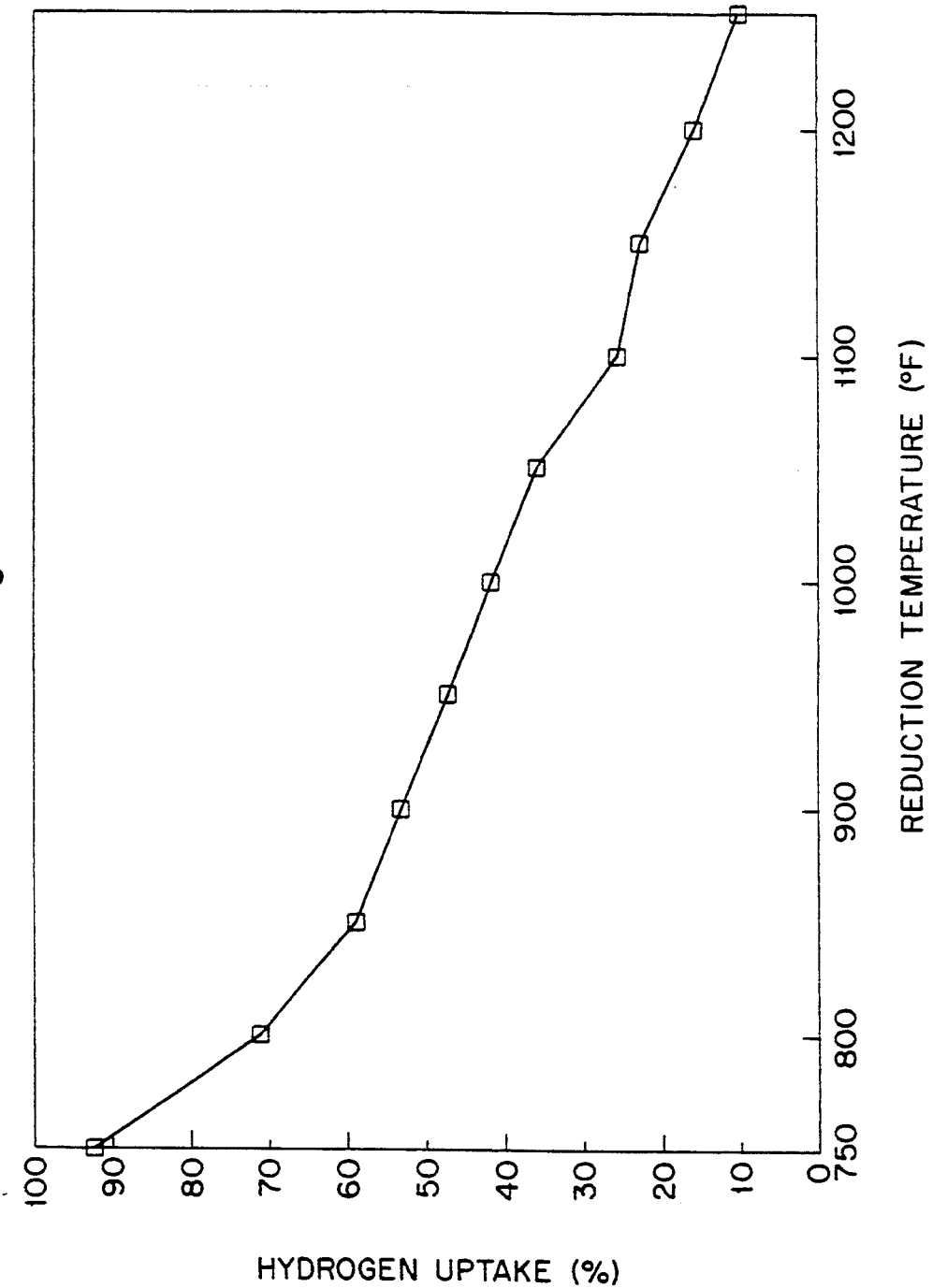
FIG. 1 of the Drawing is a graphical representation of hydrogen uptake onto catalyst as a function of temperature.

In its broadest aspect, the present invention is a process for increasing the conversion and/or lowering the fouling rate of large-pore zeolitic reforming catalysts using a pretreatment process. This catalyst is treated in a reducing gas at a temperature of from 1025° F. to 1275° F.

Preferably, the pretreatment process occurs in the presence of hydrogen at a pressure of from 0 to 300 psig and a temperature of from 1025° F. to 1275° F. for from 1 hour to 120 hours, more preferably for at least 2 hours, and most preferably at least 4–48 hours. More preferably, the temperature is from 1050° F. to 1250° F. In general, the length of time for the pretreatment will be somewhat dependent upon the final treatment temperature, with the higher the final temperature the shorter the treatment time that is needed.

For a commercial size plant, it is necessary to limit the moisture content of the environment during the high temperature treatment in order to prevent significant catalyst deactivation. In the temperature range of from 1025° F. to 1275° F., the presence of moisture is believed to have a severely detrimental effect on the catalyst activity, and it has therefore been found necessary to limit the moisture content of the environment to as little water as possible during said treatment period, to at least less than 200 ppm.

In one embodiment, in order to limit exposure of the catalyst to water vapor at high temperatures, it is preferred that the catalyst be reduced initially at a temperature between 300° F. and 700° F. After most of the water generated during catalyst reduction has evolved from the catalyst, the temperature is raised slowly in ramping or stepwise fashion to a maximum temperature between 1025° F. and 1250° F.

The temperature program and gas flow rates should be selected to limit water vapor levels in the reactor effluent to less than 200 ppm and, preferably, less than 100 ppm when the catalyst bed temperature exceeds 1025° F. The rate of temperature increase to the final activation temperature will typically average between 5° and 50° F. per hour. Generally, the catalyst will be heated at a rate between 10° and 25° F./h. It is preferred that the gas flow through the catalyst bed (GHSV) during this process exceed 500 volumes per volume of catalyst per hour, where the gas volume is measured at standard conditions of one atmosphere and 60° F. GHSV's in excess of 5000 h$^{-1}$ will normally exceed the compressor capacity. GHSV's between 600 and 2000 h$^{-1}$ are most preferred.

The pretreatment process of the present invention occurs prior to contacting the reforming catalyst with a hydrocarbon feed.

The large-pore zeolitic catalyst is generally treated in a reducing atmosphere in the temperature range of from 1025° F. to 1275° F. Although other reducing gasses can be used, dry hydrogen is preferred as a reducing gas. The hydrogen is generally mixed with an inert gas such as nitrogen, with the amount of hydrogen in the mixture generally ranging from 1%–99% by volume. More typically, however, the amount of hydrogen in the mixture ranges from about 10%–50% by volume.

The reducing gas entering the reactor should contain less than 100 ppm water. It is preferred that it contain less than 10 ppm water. In a commercial operation, the reactor effluent may be passed through a drier containing a desiccant or sorbent such as 4 Å molecular sieves. The dried gas containing less than 100 ppm water or, preferably, less than 10 ppm water may then be recycled to the reactor.

The feed to the reforming process is typically a naphtha that contains at least some acyclic hydrocarbons or alkylcyclopentanes. This feed should be substantially free of sulfur, nitrogen, metals and other known poisons. These poisons can be removed by first using conventional hydrofining techniques, then using sorbents to remove the remaining sulfur compounds and water.

As mentioned above, the catalyst of the present invention exhibits a longer run life with heavier feedstocks, e.g., containing at least 5 wt % $C_{9}+$ hydrocarbons, than similar catalysts having been subjected to a different treatment. For example, if a L zeolite catalyst is reduced and/or pretreated by conventional methods, run lengths with feeds containing at least 5 wt % $C_{9}+$ hydrocarbons, and typically from 5–15 wt % $C_{9}+$ hydrocarbons, are comparatively short. The catalyst obtained via the treatment of the present invention, however, makes it quite practical to process such feedstocks containing the $C_{9}+$ hydrocarbons.

The feed can be contacted with the catalyst in either a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be either upward, downward, or radial. The pressure is from about 1 atmosphere to about 500 psig, with the preferred pressure being from abut 50 psig to about 200 psig. The preferred temperature is from about 800° F. to about 1025° F. The liquid hourly space velocity (LHSV) is from about 0.1 hr$^{-1}$ to about 10 hrs$^{-1}$, with a preferred LHSV of from about 0.3 hr$^{-1}$ to about 5 hrs$^{-1}$. Enough hydrogen is used to insure an H$_2$/HC ratio of up to about 20:1. The preferred H$_2$/HC ratio is from about 1:1 to about 6:1. Reforming produces hydrogen. Thus, additional hydrogen is not needed except when the catalyst is reduced and when the feed is first introduced. Once reforming is underway, part of the hydrogen that is produced is recycled over the catalyst.

The catalyst is a large-pore zeolite charged with at least one Group VIII metal. The preferred Group VIII metal is platinum, which is more selective for dehydrocyclization and which is more stable under reforming reaction conditions than other Group VIII metals. The catalyst should contain between 0.1% and 5% platinum of the weight of the catalyst, preferably from 0.1% to 1.5%.

The term "large-pore zeolite" is defined as a zeolite having an effective pore diameter of from 6 to 15 Angstroms. The preferred pore diameter is from 7 to 9 Angstroms. Type L zeolite, zeolite X, and zeolite Y, zeolite beta and synthetic zeolites with the mazzite structure are thought to be the best large-pore zeolites for this operation. Type L zeolite is described in U.S. Pat. No. 3,216,789. Zeolite X is described in U.S. Pat. No. 2,882,244. Zeolite beta is described in U.S. Pat. No. 3,308,069. ZSM-4, described in U.S. Pat. No. 4,021,447, is an example of a zeolite with the mazzite structure. Zeolite Y is described in U.S. Pat. No. 3,130,007. U.S. Pat. Nos. 3,216,789; 2,882,244; 3,130,007; 3,308,069; and 4,021,447 are hereby incorporated by reference to show zeolites useful in the present invention. The preferred zeolite is type L zeolite.

Type L zeolites are synthesized largely in the potassium form. These potassium cations are exchangeable, so that other type L zeolites can be obtained by ion exchanging the type L zeolite in appropriate solutions. It is difficult to exchange all of the original cations, since some of these cations are in sites which are difficult to reach. The potassium may be ion exchanged with an alkali or alkaline earth metal, such as sodium, potassium, cesium, rubidium, barium, strontium, or calcium. Preferably, the total amount of alkali or alkaline earth metal ions should be enough to satisfy the cation exchange sites of the zeolite or be slightly in excess.

An inorganic oxide can be used as a carrier to bind the large-pore zeolite. This carrier can be natural, synthetically produced, or a combination of the two. Preferred loadings of inorganic oxide are from 5% to 50% of the weight of the catalyst. Useful carriers include silica, alumina, aluminosilicates, and clays.

FIG. 1 is a plot of hydrogen uptake onto catalyst as a function of pretreatment temperature. As can be seen from this Figure, as the pretreatment temperature is increased, the fraction of hydrogen bound to catalyst tends to decrease. If the hydrogen uptake onto catalyst is reflective of the fraction of exposed Pt atoms, then one would typically expect a decrease in activity with an increase in temperature. The extent to which pretreating a large-pore zeolitic reforming catalyst in a reducing environment at various temperatures affects the activity of the catalyst will be demonstrated in Examples 1–8. The extent to which pretreating a large-pore zeolitic reforming catalyst in a reducing environment at various temperatures affects the fouling rate of the catalyst will be demonstrated in Examples 9, 10, 11 and 12.

EXAMPLES

EXAMPLE 1

A catalyst, consisting of 0.65% Pt on barium exchanged K-L zeolite, was pretreated by heating the catalyst in hydrogen (P=50 psig, GHSV=9000) from ambient temperature to 900° F. at a ramp of 10° F./hr and held at 900° F. for 24 hours. The temperature was adjusted to the desired reaction temperature and n-hexane was introduced. The hydrogen to hydrocarbon ratio was 5:1. After steady state was achieved, the temperature was raised to the new desired reaction temperature. The benzene production is summarized in the first line in Table 1. At 900° F., the catalyst activity declined from 80% to 75%.

TABLE 1

| Reduction/Treatment Temp | Benzene Yield, wt. % | | | |
|---|---|---|---|---|
| | 800° F. | 830° F. | 860° F. | 900° F. |
| 900° F. | 22% | 37% | 55% | 80-75% |
| 1050° F. | 22% | — | 59% | 82% |
| 1100° F. | 34% | 54% | 66% | 87% |
| 1150° F. | 28% | — | 68% | 87% |
| 1200° F. | 30% | 49% | 70% | 90% |
| 1250° F. | 24% | — | 57% | 81% |
| 1300° F. | 7% | — | 30% | 59% |
| 1350° F. | 12% | 27% | 45% | 73% |

EXAMPLE 2

In this case, the same catalyst as used in Example 1 was pretreated by heating the catalyst in hydrogen (P=50 psig, GHSV=9000) from ambient temperature to 1050° F. at a ramp of 10° F./hr and held at 1050° F. for 3 hours. The temperature was then adjusted to the desired reaction temperature and n-hexane was introduced to achieve a hydrogen to hexane ratio of 5:1. The benzene production is summarized in line 2 in Table 1.

At 860° F. and 900° F. reaction temperatures, the catalyst treated at 1050° F. was more active, producing more benzene, than the catalyst reduced at 900° F. In addition, the catalyst treated at 1050° F. did not exhibit deactivation at 900° F. Thus, pretreating at a high temperature of 1050° F. increased the activity and lowered the fouling rate of the catalyst.

EXAMPLE 3

In this case, the same catalyst as used in Example 1 was pretreated by heating the catalyst in hydrogen (P=50 psig, GHSV=9000) from ambient temperature to 1100° F. at a ramp of 10° F./hr and held at 1100° F. for 3 hours. The temperature was then adjusted to the desired reaction temperature and n-hexane was introduced to achieve a hydrogen to hexane ratio of 5:1. The benzene production is summarized in line 3 in Table 1.

At all reaction temperatures, the catalyst treated at 1100° F. was more active, producing more benzene, than the catalyst treated at 900° F. In addition, the catalyst reduced at 1100° F. did not exhibit deactivation at 900° F. Thus, pretreating at a high temperature of 1100° F. increased the activity and lowered the fouling rate of the catalyst.

EXAMPLE 4

In this case, the same catalyst as used in Example 1 was pretreated by heating the catalyst in hydrogen (P=50 psig, GHSV=9000) from ambient temperature to 1150° F. at a ramp of 10° F./hr and held at 1150° F. for 3 hours. The temperature was then adjusted to the desired reaction temperature and n-hexane was introduced to achieve a hydrogen to hexane ratio of 5:1. The benzene production is summarized in line 4 in Table 1.

At the reaction temperatures of 800° F., 860° F. and 900° F., the catalyst treated at 1150° F. was more active, producing more benzene, than the catalyst treated at 900° F. In addition, the catalyst treated at 1150° F. did not exhibit deactivation at 900° F. Thus, pretreating at a high temperature of 1150° F. increased the activity and lowered the fouling rate of the catalyst.

EXAMPLE 5

In this case, the same catalyst as used in Example 1 was pretreated by heating the catalyst in hydrogen (P=50 psig, GHSV=9000) from ambient temperature to 1200° F. at a ramp of 10° F./hr and held at 1200° F. for 3 hours. The temperature was then adjusted to the desired reaction temperature and n-hexane was introduced to achieve a hydrogen to hexane ratio of 5:1. The benzene production is summarized in line 5 in Table 1.

At all reaction temperatures, the catalyst treated at 1200° F. was more active, producing more benzene, than the catalyst reduced at 900° F. In addition, the catalyst treated at 1200° F. did not exhibit deactivation at 900° F. Thus, pretreating at a high temperature of 1200° F. increased the activity and lowered the fouling rate of the catalyst.

EXAMPLE 6

In this case, the same catalyst as used in Example 1 was pretreated by heating the catalyst in hydrogen (P=50 psig, GHSV=9000) from ambient temperature to 1250° F. at a ramp of 10° F./hr and held at 1250° F. for 3 hours. The temperature was then adjusted to the desired reaction temperature and n-hexane was introduced to achieve a hydrogen to hexane ratio of 5:1. The benzene production is summarized in line 6 in Table 1.

At the reaction temperatures of 800° F., 860° F. and 900° F., the catalyst treated at 1250° F. was more active, producing more benzene, than the catalyst reduced at 900° F. In addition, the catalyst treated at 1250° F. did not exhibit deactivation at 900° F. Thus, pretreating at a high temperature of 1250° F. increased the activity and lowered the fouling rate of the catalyst.

EXAMPLE 7

The catalyst used in Example 1 was pretreated by heating the catalyst in hydrogen (P=50 psig, GHSV-9000) from ambient temperature to 1300° F. at a ramp of 10° F./hr and held at 1300° F. for 3 hours. The temperature was then adjusted to the desired reaction temperature and n-hexane was introduced to achieve a hydrogen to hexane ratio of 5:1. The benzene production is summarized in line 7 in Table 1.

At all reaction temperatures, the catalyst treated at 1300° F. was less active, producing less benzene, than the catalyst reduced at 900° F.

EXAMPLE 8

The catalyst used in Example 1 was pretreated by heating the catalyst in hydrogen (P=50 psig, GHSV=9000) from ambient temperature to 1350° F. at a ramp of 10° F./hr and held at 1350° F. for 8 hours. The temperature was then adjusted to the desired reaction temperature and n-hexane was introduced to achieve a hydrogen to hexane ratio of 5:1. The benzene production is summarized in line 8 in Table 1.

At all reaction temperatures, the catalyst treated at 1350° F. was less active, producing less benzene, than the catalyst reduced at 900° F.

EXAMPLE 9

A comparison of catalyst activity and fouling rate after reduction at 500°-900° F. and 500°-1050° F. was made as follows.

In the first case, eighty cubic centimeters of catalyst consisting of 0.65 wt. % platinum on barium exchanged, L zeolite, 1/16 inch extrudates were charged to a one-inch diameter reactor. The catalyst was dried by heating to 500° F. in dry nitrogen flowing at a rate of 12 cubic feet per hour. Catalyst reduction was then initiated at 500° F. by replacing the nitrogen with dry hydrogen (preferably containing <ppm water) flowing at the same rate. After an hour at 500° F., the temperature was raised in stepwise fashion to 900° F. and maintained at 900° F. for 12 hours to complete the catalyst reduction and dryout. The catalyst was then cooled to 800° F. for feed introduction.

In the second case, the same procedure was used except that after the initial reduction at 500° F. for one hour, the temperature was raised 10° F./h to 1050° F. The catalyst was then maintained for two days at 1050° F. in flowing hydrogen before cooling to reaction temperature. The gas flow rate was 12 ft$^3$/hr throughout.

The feed for the catalyst performance test was a hydrotreated raffinate from an aromatics extraction unit consisting of 8.5% $C_5$, 59.5% $C_6$, 26.3% $C_7$, and 5.8% $C_8$+ compounds on a weight basis. This feed was also characterized as 85.8% paraffins, 6.8% naphthenes, 6.7% aromatics, and 0.7% unknowns by weight. The test was carried out at a feed rate of 1.6 liquid hourly space velocity, 100 psig, and a hydrogen to feed molar ratio of 3.0. The catalyst bed temperature was adjusted as the run progressed to maintain 42 wt % aromatics in the $C_5$+ product. The combined hydrogen and naphtha feedstream was treated to reduce its sulfur content to less than 5 ppb.

Figure 2:
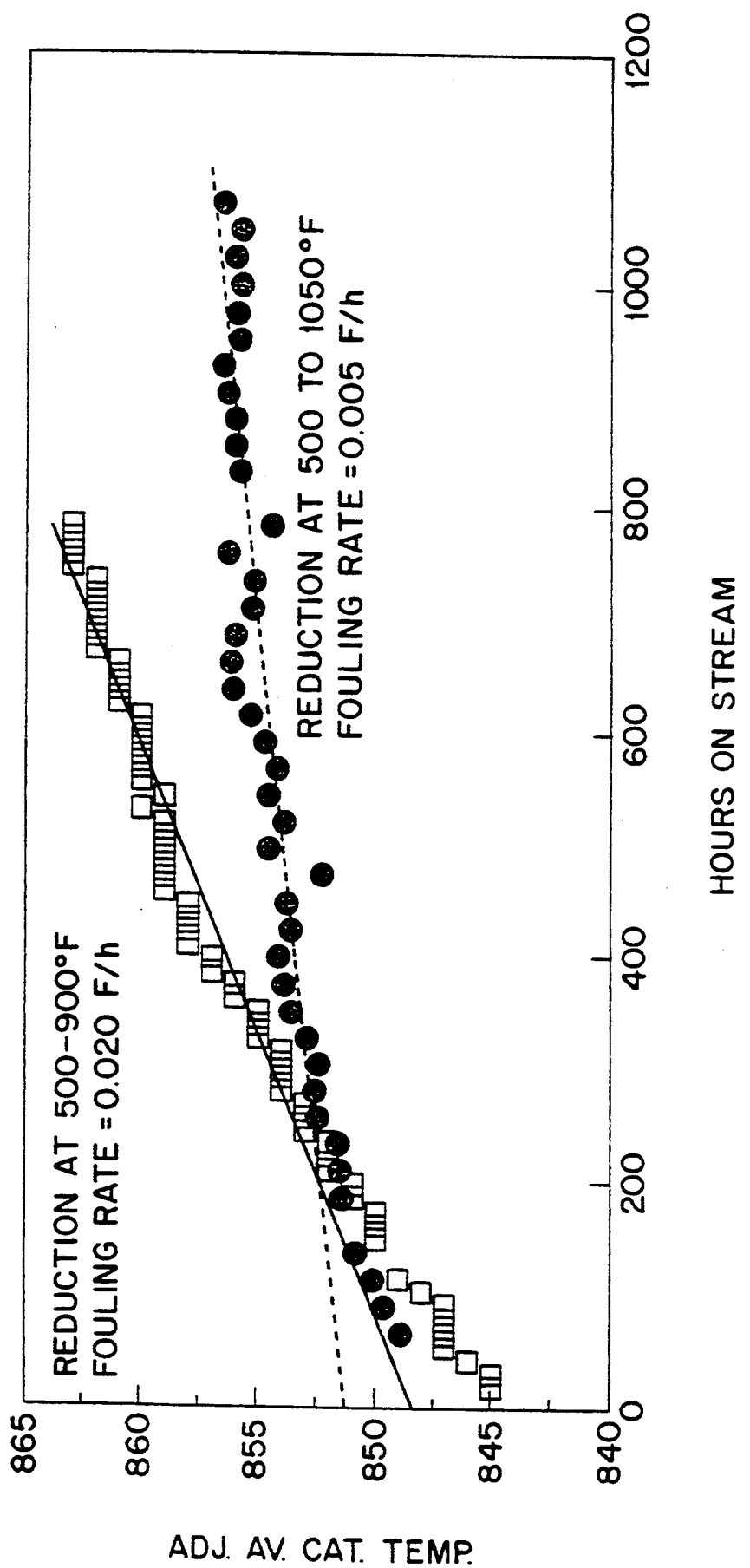
FIG. 2 of the Drawing is a graphical representation of the fouling rates observed for different temperature treatments.

The results of the test runs are shown in FIG. 2. The catalyst fouling rates were calculated by a least squares fit of the data obtained after 200 hours onstream. The catalyst reduced/treated at 500°–1050° F. had about one-fourth the fouling rate of the catalyst reduced at 500°–900° F. (0.005 versus 0.020° F./h). The start-of-run temperatures obtained by extrapolating the least squares line back to start-of-run were 852° F. and 847° F., respectively. The yield of $C_5$+product was 85 LV % of feed in both cases. Assuming the fouling rate is constant and the end-of-run average catalyst temperature is 935° F., the projected run length is about two years for the catalyst treated at 1050° F. compared to about six months for the catalyst treated at 900° F.

EXAMPLE 10

This example shows that the decreased coking tendencies of the high temperature reduced catalyst make it possible to carry out a reforming process under previously impractical conditions. Compared to Example 9, the liquid hourly space velocity was increased to 1.7, the hydrogen/hydrocarbon ratio was reduced to 2.0, the pressure was increased to 130 psig, the aromatics content of the $C_5$+ product was increased to 72 wt. %, and a heavier feed was employed. Each of these changes would be expected to increase fouling.

A feed containing 2.7% $C_5$ and lighter, 8.5% $C_6$, 49.4% $C_7$, 30.8% $C_8$, and 8.7% $C_9$+ components was reformed over the 500°–1050° F. reduced catalyst from Example 9. The feed was further characterized as containing 66.6% paraffins, 22.6% naphthenes, 10.5% aromatics, and 0.25% unknowns. Over a period of about 400 hours, the fouling rate under these conditions was 0.018° F./h which corresponds to more than six months run length.

EXAMPLE 11

In order to limit catalyst deactivation during the high temperature treatment, it is important to control water vapor concentrations. This is especially important in a commercial unit where gas-hourly-space-velocities are limited by compressor size. It is possible to limit the exposure of the catalyst to water vapor at high temperatures by using dry hydrogen, measuring the moisture levels in the reactor effluent, setting target values for each temperature range, and limiting the rate of heatup to stay within the target moisture level ranges. A commercial high temperature treatment was simulated in a small pilot plant as follows.

Eighty cubic centimeters of 1/16-inch catalyst extrudates were charged to a one-inch diameter tubular reactor. The catalyst comprised 0.65 wt % platinum, barium exchanged L-zeolite, and a binder. The reactor was heated by a three-zone electric furnace. Catalyst bed temperatures were measured by six thermocouples located in an axial thermowell. The reaction system comprised: the reactor, a chilled liquid-gas separator, a moisture analyzer probe, a compressor, a recycle-gas drier, and a recycle gas flowmeter. The moisture analyzer measured the moisture content in the recycle gas before or after the drier. The drier was charged with 4 Å molecular sieves.

The unit was pressurized to 70 psig with dry nitrogen containing less than 10 ppm water. The compressor was started. Nitrogen addition was continued in order to produce an off-gas stream and purge the system of oxygen. After two hours, the nitrogen addition rate was reduced until there was only a small off-gas stream. The gas circulation rate was adjusted to maintain a gas flow over the catalyst bed corresponding to a GHSV of about 1000 h$^{-1}$. The catalyst was further dried by heating the reactor to 500° F. Water in the reactor effluent was removed by a drier, so that the recycle gas contained less than 10 ppm water. The temperature was held at 500° F. until the moisture content of the reactor effluent gas dropped below 100 ppm.

The make-up gas was then switched from nitrogen to dry hydrogen and the unit was pressurized to 100 psig. After reaching 100 psig, the hydrogen addition rate was adjusted to maintain a small gas bleed. The gas circulation rate was adjusted to obtain a GHSV of about 1000 h$^{-1}$. Following hydrogen addition, there was an increase in the water content of the reactor effluent due to catalyst reduction. This water was removed from the recycle hydrogen stream by the recycle-gas driers. The reactor-inlet gas contained less than 10 ppm water. The reactor temperature was held at 500° F. until the water in the reactor effluent again dropped below 100 ppm. The reactor temperature was then raised 10° F./h to 900° F. Temperature was held at 900° F. until the moisture level in the reactor effluent dropped to 20 ppm. The reactor was then heated to 1100° F. at a rate of 10° F./h. After a 3-hour hold at 1100° F., the temperature was dropped to 800° F. and the naphtha feed was introduced.

The high temperature treated catalyst was tested with several feeds at several different conditions. When tested at the conditions used in Example 9, but with a heavier feed, the fouling rate was 0.007° F./h compared to 0.025° F./h for the same catalyst reduced in the temperature range of from 500° to 900° F.

EXAMPLE 12

A potassium L-zeolite catalyst also surprisingly benefits from a high temperature hydrogen treatment. Platinum was loaded onto a bound, 20–40 mesh, K-L zeolite support using the incipient wetness impregnation method and an aqueous $Pt(NH_3)Cl_2$—$H_2O$ solution. The impregnated material was oven-dried at 120° F. overnight and calcined at 500° F. for four hours.

In three separate experiments, one-gram of the calcined material was loaded into a 3/16" I.D. tubular microreactor. In each case, the catalyst was dried by heating to 500° F. in nitrogen flowing at a rate of 550 cc/min. In the first experiment, the catalyst was reduced in 550 cc/min of hydrogen while the reactor temperature was heated from 500° to 900° F. at a rate of 10° F./h. In the second and third experiments, the activation procedure was the same except that the final temperatures were 1100° and 1150° F. respectively The catalyst samples were held at their peak temperature for three hours, then cooled to 875° F. for testing.

A $C_5$-$C_8$ raffinate stream from an aromatics extraction unit was reacted in the presence of hydrogen over each catalyst sample. Reactor effluent analyses were obtained by gas chromatography. Conversion and selectivity were calculated from the feed and product analyses. Table 2 shows that the stability of the Pt-K-L zeolite catalyst was significantly improved by high temperature reduction. Conversion after about six days on-stream was significantly higher for the catalysts treated at 1100° or 1150° F. than when the reduction temperature was limited to 900° F. "Conversion" refers to the conversion of $C_6+$ feed components and "selectivity" is the selectivity for aromatics and hydrogen production. Both are calculated on a weight basis.

TABLE 2

| Catalyst Reduction Temperature | Hours on Stream | Conversion Wt % | Selectivity Wt % |
|---|---|---|---|
| 500–900° F. | 3 | 62.3 | 87.3 |
|  | 145 | 36.1 | 89.0 |
| 500–1100° F. | 6 | 61.8 | 88.5 |
|  | 146 | 50.5 | 90.9 |
| 500–1150° F. | 5 | 53.7 | 89.0 |
|  | 147 | 44.8 | 90.6 |

Run Conditions:
WHSV = 4.4, $H_2$/HC = 5.0, Temp. = 875° F., Pres. = 50 psig

What is claimed is:

1. A method of pretreating a reforming catalyst comprising a large-pore zeolite containing at least one Group VIII metal, wherein said catalyst is treated with hydrogen gas in the temperature range of from 1025° to 1275° F. while maintaining the water level of the effluent gas below 200 ppm.

2. The method according to claim 1, wherein the moisture level of the effluent gas is maintained below 100 ppm in the temperature range of 1025°–1275° F.

3. The method according to claim 1, wherein the temperature is increased at a rate between 5° and 50° F. per hour.

4. The method according to claim 1, wherein the temperature is increased at a rate between 10° and 25° F. per hour.

5. The method according to claim 1, wherein the temperature is slowly increased in a stepwise fashion.

6. The method according to claim 1, wherein the temperature is slowly increased in a ramping fashion.

7. The method according to claim 1, wherein, before a temperature of 1025° F. is reached, said catalyst is treated with hydrogen gas while slowly increasing the temperature from 900° to 1025° F., and wherein the water level of the effluent gas is maintained below 200 ppm.

8. The method according to claim 1, wherein, before a temperature of 1025° F. is reached, said catalyst is treated with hydrogen gas while slowly increasing the temperature from 900° to 1025° F., and wherein the water level of the effluent gas is maintained below 100 ppm.

9. The method of pretreating a reforming catalyst according to claim 1, wherein the catalyst comprises platinum Group VIII metal is platinum.

10. The method according to claim 9, wherein the amount of platinum is in the range of from 0.1 to 1.5 wt %.

11. The method of pretreating a reforming catalyst according to claim 1, wherein said catalyst comprises a large-pore zeolite is selected from the group consisting of zeolite X, zeolite Y, and type L zeolite, beta zeolite, or zeolites having the mazzite structure.

12. The method of pretreating a reforming catalyst according to claim 1, wherein said catalyst comprises a type L zeolite containing platinum.

13. The method of pretreating a reforming catalyst according to claim 1 wherein said catalyst comprises a large-pore zeolite and an inorganic binder.

14. The method of pretreating a reforming catalyst according to claim 13, wherein said inorganic binder is selected from the group consisting of silica, alumina, aluminosilicates, and clays.

15. The method of pretreating a reforming catalyst according to claim 1, wherein said catalyst comprises a large-pore zeolite containing at least one Group VIII metal and an alkali or alkaline earth metal selected from the group consisting of potassium, barium, strontium, calcium, sodium, rubidium, and cesium.

16. The method of pretreating a reforming catalyst according to claim 15, wherein said alkaline earth metal is barium and wherein said Group VIII metal is platinum.

17. The method of pretreating a reforming catalyst according to claim 15, wherein said catalyst has from 0.1% to 35% by weight of alkali or alkaline earth metal and from 0.1% to 5% by weight platinum.

18. The method of preheating a reforming catalyst according to claim 16, wherein said catalyst has from 0.1% to 35% by weight barium and from 0.1% to 5% by weight platinum.

19. The method of pretreating a reforming catalyst according to claim 1, wherein said catalyst comprises:
   (a) a type L zeolite containing from 0.1% to 5% by weight platinum; and
   (b) an inorganic binder selected from the group consisting of silica, alumina, aluminosilicates, and clays.

20. The method of pretreating a reforming catalyst according to claim 1, wherein said catalyst comprises:
   (a) a type L zeolite containing from 0.1% to 35% by weight alkali or alkaline earth metal and from 0.1% to 5% by weight platinum; and
   (b) an inorganic binder selected from the group consisting of silica, alumina, aluminosilicates, and clays.

21. The method of pretreating a reforming catalyst according to claim 1, wherein said catalyst comprises:
   (a) a type L zeolite containing from 0.1% to 35% by weight barium and from 0.1% to 5% by weight platinum; and
   (b) an inorganic binder selected from the group consisting of silica, alumina, aluminosilicates, and clays.

22. The method of pretreating a reforming catalyst according to claim 1, wherein said catalyst comprises:
(a) a type L zeolite containing from 0.1% to 35% by weight barium and from 0.1% to 5% by weight platinum; and
(b) an inorganic binder selected from the group consisting of silica, alumina, aluminosilicates, and clays.

23. The method according to claim 1, wherein the catalyst is subsequently used to reform a hydrocarbon feedstock containing from about 5 to 15 wt % of $C_9+$ hydrocarbon.

24. A method of pretreating a reforming catalyst comprising a large-pore zeolite, wherein said catalyst is treated with hydrogen while slowly increasing the temperature to a temperature between 1025° and 1275° F. such that the moisture level in the reactor effluent is maintained at a low enough level to permit the number of acid sites on the catalyst to be adequately reduced so as to achieve a catalyst exhibiting longer run lengths.

25. A reforming process comprised of contacting a hydrocarbon feed with a large pore zeolite catalyst containing at least one Group VIII metal, wherein the catalyst has been treated by the method according to claim 1.

* * * * *